J. W. BARD.
ELECTRICITY METER.
APPLICATION FILED JUNE 7, 1915.
1,266,652.
Patented May 21, 1918.
2 SHEETS—SHEET 1.
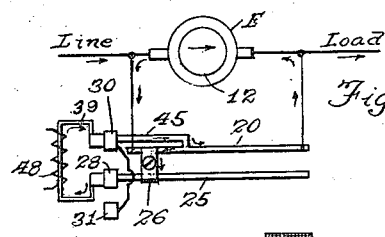
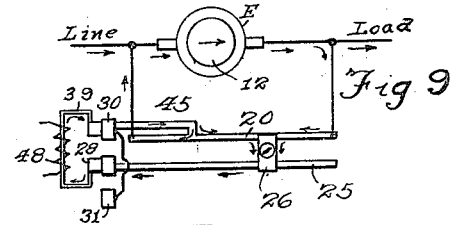
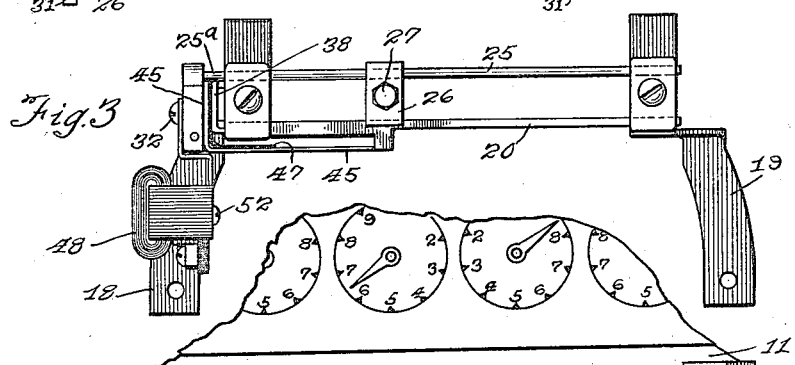
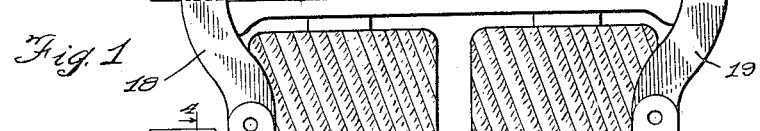
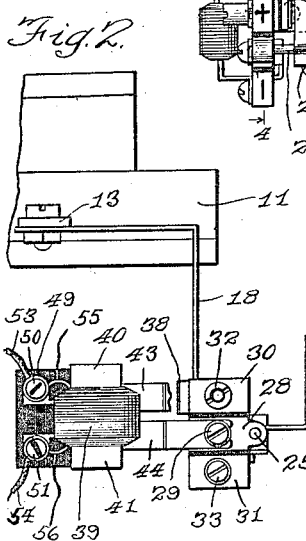
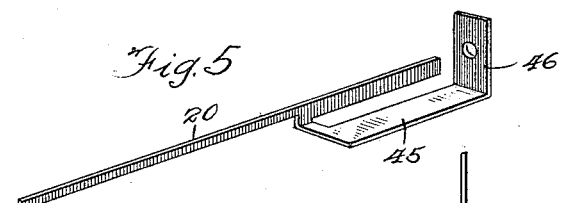
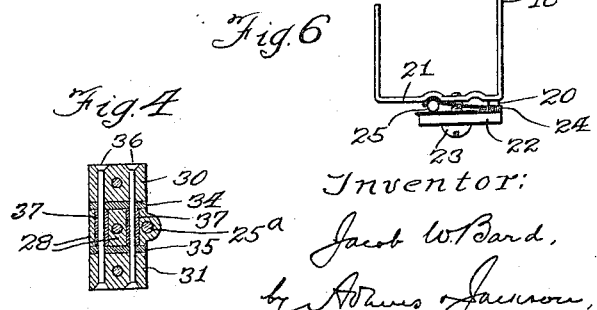
Inventor:
Jacob W. Bard,
by Adams & Jackson,
Att'ys.

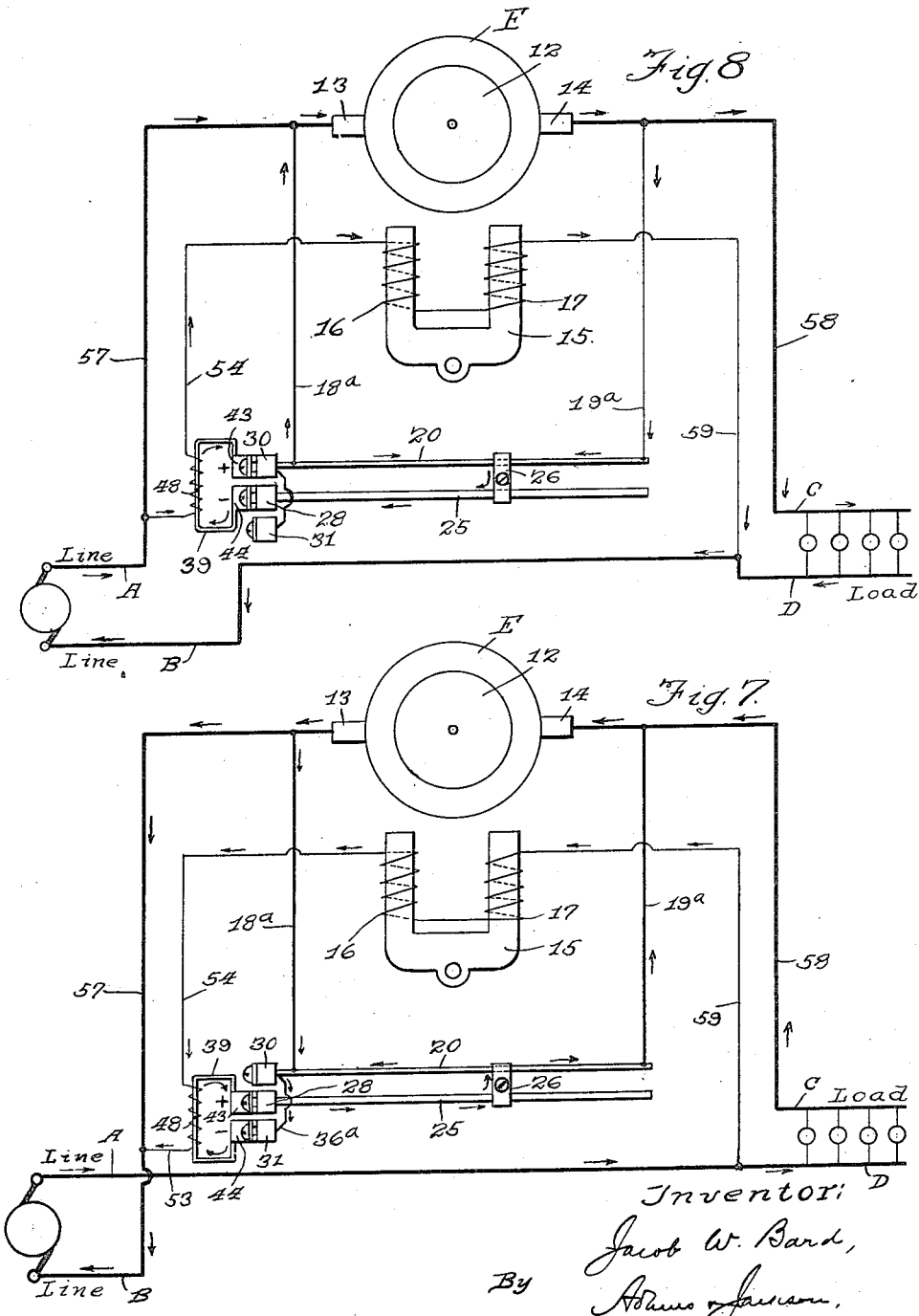

UNITED STATES PATENT OFFICE.

JACOB W. BARD, OF SPRINGFIELD, ILLINOIS, ASSIGNOR TO SANGAMO ELECTRIC COMPANY, OF SPRINGFIELD, ILLINOIS, A CORPORATION OF ILLINOIS.

ELECTRICITY-METER.

1,266,652.  Specification of Letters Patent.  Patented May 21, 1918.

Application filed June 7, 1915. Serial No. 32,656.

*To all whom it may concern:*

Be it known that I, JACOB W. BARD, a citizen of the United States, residing at Springfield, in the county of Sangamon and State of Illinois, have invented certain new and useful Improvements in Electricity-Meters, of which the following is a specification, reference being had to the accompanying drawings.

My invention relates to direct-current watthour meters of the mercury motor meter type comprising a rotating armature immersed in a mercury bath, the armature being caused to rotate by the reaction of the current flowing through it with a magnetic field acting thereon. In such meters it is desirable when measuring very light loads that means be provided for supplementing the armature-rotating effect of the load current passing through the mercury chamber, as such meters usually have a tendency to run slow in such circumstances, and heretofore it has been proposed to secure such light load compensation by means of a thermo-couple so arranged as to be energized by the current passing through the coils of the usual shunt magnet which provides the magnetic field above referred to. My present invention has to do with meters which make use of the thermo-couple for controlling the light load compensation, and it has for its object to provide improved connections between the thermo-couple and the armature; to provide an arrangement by which the thermo-couple may readily be properly connected up with the meter, regardless of whether the meter be connected with the positive or with the negative side of the line; to provide improved means for varying the armature-rotating effect of the thermo-couple current; and to provide means by which, if desired, the thermo-couple current may be employed in opposition to the load current passing through the mercury chamber. The latter feature becomes of especial importance in meters having a tendency to run fast on very light loads, and this may be compensated for by using the thermo-couple current, or a part of it, in opposition to the load current.

In the accompanying drawings, which show only such portions of a meter as are necessary to an understanding of my present invention,—

Figure 1 is a front elevation showing the shunt magnet and coils, the thermo-couple, and the parts connected thereto;

Fig. 2 is an end view of the parts shown in Fig. 1, illustrating, also, a part of the casing in which the armature is mounted;

Fig. 3 is a bottom view of the thermo-couple and its connections;

Fig. 4 is a vertical section on line 4—4 of Fig. 1, showing the arrangement and connections of the contact blocks to which the terminals the thermo-couple are connected;

Fig. 5 is a perspective view showing the resistance bar which forms one of the connections between the thermo-couple and the mercury chamber in which the armature rotates;

Fig. 6 is an end view illustrating one of the brackets by which the thermo-couple connections are secured in position, showing such connections in place;

Figs. 7 and 8 are diagrammatic views showing how the thermo-couple may be connected so that the thermo-couple current will flow through the mercury chamber in the same direction as the load current, regardless of whether the meter be connected directly to the positive or to the negative line wire; and Figs. 9 and 10 are diagrammatic views showing how without shifting the position of the thermo-couple itself the armature-driving-effect of the thermo-couple current may be varied so as to operate either in unison with the load current or in opposition to it.

In the drawings I have illustrated my improvements as applied to a mercury motor meter of the type in which the poles of the shunt magnet are disposed below the chamber containing the mercury, and in which the connections are such that current may flow in either direction through the mercury chamber and shunt coils without reversing the direction of rotation of the armature. The arrangement of the mercury chamber, armature and shunt magnet illustrated in the drawings herein is substantially like that shown in Letters Patent No. 910,548, to R. C. Lanphier, dated January 26, 1909.

Referring now to the drawings for a particular description of the embodiment of my invention therein illustrated, 11 indicates the casing which contains the mercury chamber, in which is mounted a rotating armature in the form of a disk of copper or equivalent material which is illustrated diagrammatically at 12 in Figs. 7 and 8. At opposite sides of the mercury chamber and projecting through the casing 11 are two contacts 13—14 by which electrical connection is made with the mercury chamber. 15 indicates the shunt electro-magnet which, as shown, in Fig. 1, is so arranged that its poles lie immediately below the mercury chamber. 16—17 indicate the coils of the shunt magnet 15. It will be understood that the coils 16—17 are in shunt relation to the armature circuit, the mercury chamber being connected in series with the load. As is well understood, when current flows through the line and consequently through the mercury chamber and armature, the energization of the shunt magnet 15 causes the armature to rotate. The meter may be connected with either the positive or the negative side of the line, and the flow of current through the mercury chamber and shunt may be reversed without changing the direction of rotation of the armature, as will be apparent from the diagrammatic illustration given in Figs. 7 and 8,—Fig. 7 showing the current as flowing from right to left through the armature and shunt coils, and Fig. 8 showing opposite flow of the current.

18—19 indicate two metal brackets which connect, respectively, with the contacts 13—14 of the mercury chamber, and serve, also, as supports for certain parts of the apparatus which will be hereinafter described. 20 indicates a high resistance conductor, preferably in the form of a bar or strip of suitable metal, which extends across from the bracket 18 to the bracket 19, as shown in Fig. 3, the ends of said bar being in electrical connection with said brackets. In the construction illustrated, the ends of said resistance bar are secured in electrical contact with said brackets by bending said brackets at right angles as shown at 21 in Fig. 6 and binding the end portions of said bar thereagainst by clamping-plates 22 secured by screws 23. 24 indicates insulating plates between the bar 20 and the clamping-plates 22.

25 indicates a wire of high conductivity, which is arranged parallel with the high resistance bar 20 and is also held in place against the bent end portions 21 of the brackets 18—19 by the clamping-plates 22. Said wire 25 is insulated both from the brackets 18—19 and from the clamping-plates 22 by the insulation 24, as shown in Fig. 6. As best shown at 25ª in Figs. 1 and 3, one end of the high conductivity wire 25 extends beyond the bracket 18, for a purpose which will be hereinafter set forth. 26 indicates a bridging connection in the form of a slide which rides upon the bar 20 and wire 25 as shown in Figs. 1 and 3. Said slide is preferably composed of two blocks which embrace the members on which they slide, being preferably grooved to that end, and are held together by a bolt 27. By this means the bridging connection or clamp may be secured in any desired position. By moving the clamp longitudinally upon said conductors, the effect of the thermo-electric current on the operation of the meter may be varied as will hereinafter more clearly appear.

28 indicates a connecting block which is fitted upon the projecting end 25ª of the wire 25, as shown in Figs. 1 and 2, said block having a binding-screw 29. 30—31 indicate similar blocks placed at opposite sides of the block 28 and having binding-screws 32—33, respectively. As best shown in Fig. 4, the blocks 28, 30 and 31 are connected together to form a unitary device, the two end blocks 30—31 being insulated from the intermediate block 28 by insulating-plates 34—35. The end blocks 30—31 are connected together by rivets 36, or equivalent devices, said rivets being insulated from the block 28 by insulating cylinders 37. The block 30 and through it the blocks 28 and 31 are secured by means of the binding-screw 32 to a lug 38 carried by the bracket 18, as best shown in Fig. 3.

From the foregoing description it will be seen that the wire 25 is insulated from the brackets 18—19 except as it may be connected therewith through the slide 26 and the resistance strip 20. Said wire 25, is, however, always connected with the block 28; also, the ends of the high resistance strip 20 are in constant electrical connection with the brackets 18—19 and through said brackets with the terminals or contacts of the mercury chamber. In the construction shown in Figs. 1 to 6, the operation of which is diagrammatically illustrated in Figs. 9 and 10, the block 30 is insulated from the bracket 18 and strip 20, but for operating as shown in Figs. 7 and 8, the resistance strip 20 is in electrical connection with the blocks 30 and 31.

39 indicates a thermo-couple comprising two plates 40—41 of suitable dissimilar metals, such as a plate of copper and a plate of suitable alloy, said plates being soldered together at one end. Said plates are bent to rectangular form, their opposite ends being separated and being provided with parallel ears 43—44 adapted to be secured to the blocks 28—30—31 by the binding-screws with which said blocks are provided. A high resistance coil 48 is wound upon the joined ends of the plates 40—41 so that by passing an electric current through said coil, said plates are heated and an electric current generated. The thermo-couple illustrated is more fully shown and described in my application Serial No. 815,425, filed Jan. 30, 1914, now Patent No. 1,221,270, issued Apr. 3, 1917, of which this application is a continuation as to that subject matter and therefore the foregoing brief description of the thermo-couple which I prefer to employ will suffice so far as this application is concerned.

49 indicates an insulating plate which carries binding-posts 50—51, said plate being secured to the thermo-couple plates 40—41 in any suitable way, as by screws 52, shown in Fig. 3. 53 indicates a wire connected with the binding-post 50 and adapted to be connected to one of the line wires. 54 indicates one of the wires of the shunt coils 16—17, which is connected with the binding-post 51. 55—56 indicate the ends of the coil 48, which are connected with the binding-posts 50—51, respectively, as shown in Fig. 2.

As best shown in Fig. 2, the ears 43—44 of the thermo-couple are adapted to be connected to the blocks 30 and 28, respectively, or to the blocks 28 and 31, respectively, by the binding-posts carried by said blocks. In Figs. 1, 2 and 8 the two ears 43—44 are connected with the blocks 30 and 28, so that, assuming the ear 43 to be the positive terminal of the thermo-couple, the block 30 becomes an extension of the positive terminal and the block 28 an extension of the negative terminal thereof, but by shifting the ears 43—44 so that the ear 43 is connected with block 28 and the ear 44 with block 31, as illustrated in Fig. 7, the intermediate block 30 becomes the positive terminal of the thermo-couple and the block 31 the negative terminal, thus reversing the polarity of said blocks. The blocks 30 and 31 being in electrical connection with each other, their polarity is always the same.

The object of providing for this change of polarity in the thermo-couple blocks 28, 30 and 31 is to adapt the thermo-couple for use with the meter regardless of whether the meter is connected to the positive or to the negative line wire. As is well understood, the direction of flow of current through the thermo-couple coil 48 has no effect on the polarity of the members of the couple, as if the terminal 43, for example, of the thermo-couple is positive, it will always be positive regardless of the direction of flow of current through the coil 48. The direction of flow of current through the mercury chamber, however, as well as the direction of flow of current through the shunt coils 16—17 depends upon whether the meter is connected to the positive or to the negative side of the line, and as meters of this type usually run slow on very light loads, it is necessary, in order to utilize the thermo-couple current to the best advantage for compensation on light loads, to provide means by which the current generated by the thermo-couple may be passed through the mercury chamber in the same direction as the flow of the load current therethrough, and to provide for accomplishing this expeditiously and simply according as the meter may be connected to the positive or negative side of the line. By my invention this is effected by merely shifting the thermo-couple terminals 43—44 so as to change the polarity of the blocks 28, 30 and 31 to suit the requirements of the situation. In the case of meters which run fast on very light loads, it is desirable that means be provided by which the thermo-couple current may be used in opposition to the load current flowing through the mercury chamber, and as a means to that end the high resistance strip or bar 20 is connected at an intermediate point thereof with the blocks 30—31 by means of a plate or other low resistance connection 45, preferably formed integral with the bar 20, and branching therefrom as illustrated in Fig. 5. In the form shown, the plate 45 extends parallel with the bar 20 for a greater or less part of its length, preferably about a third, and is bent at one end to form an ear 46 which is adapted to be secured to the block 30 by means of the binding-screw 32, as best shown in Fig. 3. The ear 46 is insulated from the lug 38 by means of a sheet of insulation 47, as shown in Fig. 3. Thus the blocks 30—31 are always connected through said plate 45 with an intermediate point of the high resistance bar 20. The slide 26 is arranged so that it may pass the juncture of the plate 45 with the bar 20 so as to connect the conducting wire 25 with the high resistance bar 20 at either side of said juncture, as illustrated in Figs. 9 and 10. In cases where it is not desired to provide for using the thermo-electric current in opposition to the load current flowing through the mercury chamber, the high resistance wire 20 is in electrical connection with the blocks 30—31 through the bracket 18 and the plate 45 is not used, the ear 38 being then fitted directly against the block 30 so that the bracket 18 is in electrical connection with the blocks 30—31.

In Figs. 7 and 8 I have illustrated all the circuits in an arrangement in which provision is not made for using the thermo-electric current in opposition to the load current flowing through the mercury chamber, and in Figs. 9 and 10 I have illustrated the course of the load and thermo-electric currents in a meter having provision for using the thermo-electric current either in aid of or in opposition to the load current.

Referring first to Figs. 7 and 8, A—B indicate, respectively, the positive and negative line wires, and C—D the two load wires. E indicates the mercury chamber in which the armature of the meter rotates. 57 indicates a wire connecting terminal 13 with the line wire B. 58 indicates a wire connecting terminal 14 with load wire C. 59 indicates a wire connecting the shunt coils 16—17 with line wire A. 18ª—19ª indicate wires corresponding with the brackets 18—19 and connecting the end portions of the high resistance strip 20 with the two contacts 13—14 of the mercury chamber. 36ª indicates a wire, corresponding with the rivets 36, which connects the blocks 30—31. With the connections arranged as shown in Fig. 7, the current will come in by wire A to load line D, returning by wire C and passing by wire 58 to the contact 14 of the mercury chamber, thence through the mercury and armature to contact 13, and thence by wire 57 to return wire B. At the same time part of the current will pass over wire 59 to the shunt coils 17—16, thence by wire 54 to the coil 48 of the thermo-couple, thence by wire 53 back to wire 57 and return wire B. This will energize the thermo-couple, generating a current which will flow by terminal 43 to block 28, through wire 25, across the bridging slide 26 to high resistance strip 20, thence through wire 19ª (representing bracket 19) to terminal 14 of the mercury chamber, thence through the mercury and armature to contact 13, thence through wire 18ª (representing bracket 18) to blocks 30 and 31 to the terminal 44, completing the circuit. By shifting the slide 26 upon the conductors 20—25, a greater or less amount of resistance may be placed in the circuit, thereby varying the rotative effect of the thermo-electric current upon the armature and consequently varying its rate of operation.

If the meter be connected to the positive line wire, as shown in Fig. 8, so that the load current flows through the armature and mercury chamber in the opposite direction, the thermo-couple is then connected in the manner shown in Figs. 2 and 8 so that the block 30 becomes its positive terminal and block 28 its negative terminal. The thermo-electric current then flows from block 30 by wire 18ª (representing the bracket 18) to contact 13 of the mercury chamber, thence through the mercury and armature to contact 14, thence by wire 19ª (representing the bracket 19) to high resistance strip 20, thence by slide 26 to wire 25 and through it to the negative block 28. It will be noted that with this arrangement, also, the thermo-couple current moves in the same direction through the mercury chamber as the load current.

When it is desired to provide for using the thermo-electric current either in aid of or in opposition to the load current as regards its rotative effect upon the armature, the high resistance bar 20 is provided with the connection 45, and the circuits are then as shown in Figs. 9 and 10. For example, referring to Fig. 9, if the slide 26 is placed at the right of the point of connection of the member 45 with the resistance bar 20 and the thermo-couple is connected with the blocks 30 and 28 as illustrated so that the load current flows through the mercury from left to right as indicated by the arrows, the thermo-couple current will then flow through the mercury chamber in the same direction as the load current and will assist in rotating the armature, thus compensating for slow running of the meter on light load. The slide 26 is of course adjusted to the proper point to secure the necessary compensation, in the manner already described. If, however, the meter runs fast on light load, so that it is necessary to reduce its rate of operation, the slide 26 is moved to the left of the point of connection between the member 45 and the high resistance bar 20, in which case, as indicated by the arrows, the thermo-electric current will flow through the mercury chamber in a direction opposite to that of the load current and consequently will reduce the rotative effect of the load current correspondingly. By adjusting the slide 26 to the desired point, such compensation as may be necessary can be secured.

That which I claim as my invention, and desire to secure by Letters Patent, is,—

1. An electricity meter, comprising a suitable casing having a mercury chamber, an armature adapted to rotate therein, means coacting with a load current flowing through the meter to rotate said armature, means for supplying an auxiliary current, and means adjustable to direct more or less of said auxiliary current through the mercury chamber in either direction.

2. An electricity meter, comprising a suitable casing having a mercury chamber, an armature adapted to rotate therein, means coacting with a load current flowing through the meter to rotate said armature, means for supplying an auxiliary current, and means having connections adjustable to direct said auxiliary current through the mercury chamber in either direction and to vary the armature-rotating effect of said auxiliary current without changing the direction in which it flows through the mercury chamber.

3. An electricity meter, comprising a suitable casing having a mercury chamber, an armature adapted to rotate therein, means coacting with a load current flowing through the meter to rotate said armature, means for supplying an auxiliary current, means having connections adjustable to direct said auxiliary current through the mercury chamber in opposition to the load current and means for varying the armature-rotating effect of said auxiliary current without changing the direction in which it flows through the mercury chamber.

4. An electricity meter, comprising a suitable casing having a mercury chamber, an armature adapted to rotate therein, means coacting with a load current flowing through the meter to rotate said armature, means for supplying an auxiliary current, means having connections adjustable to direct said auxiliary current through the mercury chamber either in aid of or in opposition to the load current and means for varying the armature-rotating effect of said auxiliary current without changing the direction in which it flows through the mercury chamber.

5. An electricity meter, comprising a suitable casing having a mercury chamber, an armature adapted to rotate therein, means coacting with a load current flowing through the meter in either direction to rotate said armature in a constant direction, means for supplying an auxiliary current, means having connections adjustable to direct said auxiliary current through the mercury chamber in one direction or the other simultaneously with the load current and means for varying the armature-rotating effect of said auxiliary current without changing the direction in which it flows through the mercury chamber.

6. A direct-current electricity meter, comprising a suitable casing having a mercury chamber, an armature adapted to rotate therein, means coacting with a load current flowing through the meter to rotate said armature, a thermo-couple for generating an auxiliary current, and means adjustable to direct said auxiliary current through the mercury chamber in either direction.

7. A direct-current electricity meter, comprising a suitable casing having a mercury chamber, an armature adapted to rotate therein, means coacting with a load current flowing through the meter in either direction to rotate said armature in a constant direction, means for supplying an auxiliary current, and means adjustable to direct more or less of said auxiliary current through the mercury chamber in one direction or the other simultaneously with the load current and in the same direction.

8. A direct-current electricity meter, comprising a suitable casing having a mercury chamber, an armature adapted to rotate therein, means coacting with a load current flowing through the meter to rotate said armature, a thermo-couple for generating an auxiliary current, means having connections adjustable to direct said auxiliary current through the mercury chamber in either direction and for varying the armature-rotating effect of said auxiliary current without changing the direction in which it flows through the mercury chamber.

9. An electricity meter, comprising a suitable casing having a mercury chamber, an armature adapted to rotate therein, means coacting with a load current flowing through the meter to rotate said armature, means for supplying an auxiliary current, and means having connections for directing said auxiliary current through the mercury chamber, and being adjustable to vary the armature-rotating effect of said auxiliary current without changing the direction in which it flows through the mercury chamber.

10. A direct-current electricity meter, comprising a suitable casing having a mercury chamber, an armature adapted to rotate therein, means coacting with a load current flowing through the meter to rotate said armature, a thermo-couple for generating an auxiliary current, and means adjustable independently of the load current to direct all or a part of said auxiliary current through the mercury chamber.

11. A direct-current electricity meter, comprising a suitable casing having a mercury chamber and contacts leading thereto, an armature adapted to rotate in said chamber, means coacting with a load current flowing through the meter to rotate said armature, a thermo-couple for generating an auxiliary current, terminal members connected with the mercury chamber contacts, said thermo-couple being adapted to be connected with said terminal members and being bodily shiftable to change the direction of flow of its current through the mercury chamber.

12. A direct-current electricity meter, comprising a suitable casing having a mercury chamber and contacts leading thereto, an armature adapted to rotate in said chamber, means coacting with a load current flowing through the meter to rotate said armature, a thermo-couple for generating an auxiliary current, terminal-members connected with the mercury chamber contacts, said thermo-couple being adapted to be connected with said terminal-members and being bodily shiftable to change the direction of flow of its current through the mercury chamber, and means having connections adjustable to vary the armature-rotating effect of the thermo-couple current independently of adjustment of the thermo-couple itself.

13. A direct-current meter, comprising a suitable casing having a mercury chamber, an armature adapted to rotate therein, means coacting with a load current flowing through the meter to rotate said armature, a thermo-couple for generating an auxiliary current, an intermediate block, contact blocks at opposite sides of said intermediate block and connected together, the terminals of said thermo-couple being adapted to connect with the intermediate block and with either of the other blocks adjacent thereto by bodily shifting said thermo-couple, and connections for directing the thermo-couple current through the mercury chamber in one direction or the other depending upon its connections with said contact blocks.

14. A direct-current meter, comprising a suitable casing having a mercury chamber, an armature adapted to rotate therein, means coacting with a load current flowing through the meter to rotate said armature, a thermo-couple for generating an auxiliary current, an intermediate block, contact blocks at opposite sides of said intermediate block and connected together, the terminals of said thermo-couple being adapted to connect with the intermediate block and with either of the other blocks adjacent thereto by bodily shifting said thermo-couple, connections for directing the thermo-couple current through the mercury chamber in one direction or the other depending upon its connections with said contact blocks, and means for adjusting said connections to vary the armature-rotating effect of said auxiliary current without changing the direction in which it flows through the mercury chamber.

15. A direct-current meter, comprising a suitable casing having a mercury chamber, an armature adapted to rotate therein, means coacting with a load current flowing through the meter to rotate said armature, a thermo-couple for generating an auxiliary current, an intermediate block, contact blocks at opposite sides of said intermediate block and connected together, the terminals of said thermo-couple being adapted to connect with the intermediate block and with either of the other blocks adjacent thereto by bodily shifting said thermo-couple, connections for directing the thermo-couple current through the mercury chamber in one direction or the other depending upon its connections with said contact blocks, and means for adjusting said connections to change the direction of flow of said auxiliary current through the mercury chamber.

16. An electricity meter, comprising a suitable casing having a mercury chamber, an armature adapted to rotate therein, means coacting with a load current flowing through the meter to rotate said armature, a thermo-couple for generating an auxiliary current, and means including a variable resistance for connecting the terminals of said thermo-couple with opposite sides of said mercury chamber, said variable resistance being adjustable to change the direction of flow of the auxiliary current through the mercury chamber.

17. An electricity meter, comprising a suitable casing having a mercury chamber, an armature adapted to rotate therein, means coacting with a load current flowing through the meter to rotate said armature, a thermo-couple for generating an auxiliary current, and means for connecting the terminals of said thermo-couple with opposite sides of the mercury chamber, comprising a high resistance element, an element of high conductivity, and a bridging connection between said elements, the terminals of said thermo-couple being adapted to be connected with either of said connecting elements, whereby the auxiliary current may be passed in either direction through said mercury chamber.

18. An electricity meter, comprising a suitable casing having a mercury chamber, an armature adapted to rotate therein, means coacting with a load current flowing through the meter to rotate said armature, a thermo-couple for generating an auxiliary current, and means for connecting the terminals of said thermo-couple with opposite sides of the mercury chamber, comprising a high resistance element, an element of high conductivity, and a bridging connection between said elements, the terminals of said thermo-couple being adapted to be connected with either of said connecting elements, whereby the auxiliary current may be passed in either direction through said mercury chamber, said bridging connection being adjustable to vary the armature-rotating effect of said auxiliary current.

19. An electricity meter, comprising a suitable casing having a mercury chamber, an armature adapted to rotate therein, means coacting with a load current flowing through the meter to rotate said armature, a thermo-couple for generating an auxiliary current, and means for connecting the terminals of said thermo-couple with opposite sides of the mercury chamber, comprising a high resistance element, an element of high conductivity, and a bridging connection between said elements, the terminals of said thermo-couple being adapted to be connected with either of said connecting elements, whereby the auxiliary current may be passed in either direction through said mercury chamber, said bridging connection being adjustable to vary the direction of flow of the auxiliary current through the mercury chamber.

20. An electricity meter, comprising a suitable casing having a mercury chamber, an armature adapted to rotate therein, means coacting with a load current flowing through the meter to rotate said armature, a thermo-couple for generating an auxiliary current, and means for connecting the terminals of said thermo-couple at opposite sides of the mercury chamber, comprising a high resistance element, an element of high conductivity, and a bridging connection between said elements, said bridging connection being adjustable to vary the direction of flow of said auxiliary current through the mercury chamber.

21. An electricity meter, comprising a suitable casing having a mercury chamber, an armature adapted to rotate therein, means coacting with a load current flowing through the meter to rotate said armature, a thermo-couple for generating an auxiliary current, means for connecting the terminals of said thermo-couple with opposite sides of the mercury chamber, comprising a high resistance bar connected intermediately with one of the terminals of said thermo-couple, the end portions of said bar being connected with opposite sides of the mercury chamber, a conductor connected with the other terminal of said thermo-couple, and an adjustable connection between said conductor and said resistance bar for varying the direction of flow of the auxiliary current through the mercury chamber.

22. An electricity meter, comprising a suitable casing having a mercury chamber, an armature adapted to rotate therein, means coacting with a load current flowing through the meter to rotate said armature, a thermo-couple for generating an auxiliary current, means for connecting the terminals of said thermo-couple with opposite sides of the mercury chamber, comprising a high resistance bar, a conducting member connected intermediately with said resistance bar and with one of the terminals of the thermo-couple, the end portions of said resistance bar being connected with opposite sides of the mercury chamber, a conductor connected with the other terminal of said thermo-couple, and an adjustable connection movable upon said resistance bar and conductor from one side to the other of the juncture of said conducting member with said resistance bar.

JACOB W. BARD.

Witnesses:
ROBERT C. LANPHIER,
GEORGE W. AYLING.

Copies of this patent may be obtained for five cents each, by addressing the "Commissioner of Patents, Washington, D. C."